United States Patent
Ma et al.

(10) Patent No.: US 11,843,812 B2
(45) Date of Patent: Dec. 12, 2023

(54) HIGH-SPEED REAL-TIME DATA TRANSMISSION METHOD AND APPARATUS, DEVICE, AND STORAGE MEDIUM

(71) Applicant: Lenovo (Beijing) Limited, Beijing (CN)

(72) Inventors: Rui Ma, Beijing (CN); Bojie Yu, Beijing (CN); Bin Li, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/681,170

(22) Filed: Feb. 25, 2022

(65) Prior Publication Data

US 2023/0037494 A1 Feb. 9, 2023

(30) Foreign Application Priority Data

Aug. 6, 2021 (CN) .......................... 202110902372.3

(51) Int. Cl.
| | |
|---|---|
| *H04N 21/236* | (2011.01) |
| *H04L 65/70* | (2022.01) |
| *H04L 65/75* | (2022.01) |
| *H04N 21/2187* | (2011.01) |
| *H04N 21/233* | (2011.01) |
| *H04N 21/2343* | (2011.01) |

(52) U.S. Cl.
CPC .......... *H04N 21/236* (2013.01); *H04L 65/70* (2022.05); *H04L 65/762* (2022.05); *H04N 21/2187* (2013.01); *H04N 21/2335* (2013.01); *H04N 21/2343* (2013.01)

(58) Field of Classification Search
CPC .......... H04N 21/2187; H04N 21/2335; H04N 21/2343; H04N 21/234309; H04N 21/236; H04N 21/2662; H04N 21/8456; H04N 21/8547; H04N 19/40; H04L 65/611; H04L 65/70; H04L 65/75; H04L 65/762; H04L 65/765; H04L 69/04; H04L 69/22
See application file for complete search history.

(56) References Cited

U.S. PATENT DOCUMENTS

| | | | | |
|---|---|---|---|---|
| 5,144,425 A | * | 9/1992 | Joseph | .............. H04N 19/15 375/E7.091 |
| 6,263,022 B1 | * | 7/2001 | Chen | .............. H04N 19/126 375/240.03 |

(Continued)

FOREIGN PATENT DOCUMENTS

| | | |
|---|---|---|
| CN | 101814969 A | 8/2010 |
| CN | 109981221 A | 7/2019 |

(Continued)

*Primary Examiner* — Michael B. Pierorazio
(74) *Attorney, Agent, or Firm* — ANOVA LAW GROUP, PLLC

(57) ABSTRACT

A high-speed real-time data transmission method includes performing deduplication processing on first encoded data from a transmission device to obtain target data. The first encoded data is obtained by encoding corresponding data using a first encoding algorithm. The method further includes encoding the target data using a second encoding algorithm to obtain second encoded data, and sending the second encoded data to a receiving device. A compression ratio of the second encoding algorithm is greater than a compression ratio of the first encoding algorithm.

20 Claims, 6 Drawing Sheets

(56) References Cited

U.S. PATENT DOCUMENTS

| | | | | |
|---|---|---|---|---|
| 6,490,705 B1* | 12/2002 | Boyce | H04N 19/66 | 714/776 |
| 6,496,217 B1* | 12/2002 | Piotrowski | H04N 19/89 | 375/E7.005 |
| 6,501,797 B1* | 12/2002 | van der Schaar | H04N 19/34 | 708/203 |
| 6,674,477 B1* | 1/2004 | Yamaguchi | H04N 19/50 | 375/E7.113 |
| 7,095,782 B1* | 8/2006 | Cohen | H04N 21/2404 | 375/E7.02 |
| 7,602,846 B1 | 10/2009 | Wu et al. | | |
| 7,958,532 B2* | 6/2011 | Paul | H04N 21/234327 | 725/135 |
| 8,064,389 B2* | 11/2011 | Khan | H04B 7/2123 | 375/240 |
| 8,072,943 B2* | 12/2011 | Khan | H04L 1/0625 | 370/335 |
| 9,838,452 B2* | 12/2017 | Bae | H04L 41/5019 | |
| 2001/0048680 A1 | 12/2001 | Yoshimura et al. | | |
| 2004/0208239 A1* | 10/2004 | Karlsson | H04K 3/82 | 375/219 |
| 2004/0264433 A1 | 12/2004 | Melpignano | | |
| 2007/0179948 A1* | 8/2007 | Jennings, III | H04L 67/1068 | |
| 2008/0062168 A1* | 3/2008 | Poullier | H04N 1/00132 | 345/419 |
| 2008/0170630 A1* | 7/2008 | Falik | H04N 21/6582 | 375/E7.193 |
| 2009/0034629 A1* | 2/2009 | Suh | H04N 21/41407 | 375/240.27 |
| 2009/0187960 A1* | 7/2009 | Lee | H04N 21/234327 | 375/E7.078 |
| 2009/0222855 A1* | 9/2009 | Vare | H04L 12/189 | 725/39 |
| 2009/0268806 A1* | 10/2009 | Kim | H04N 21/84 | 375/316 |
| 2010/0260254 A1* | 10/2010 | Kimmich | H04N 19/164 | 375/240 |
| 2010/0260268 A1* | 10/2010 | Cowan | H04N 13/178 | 348/E13.001 |
| 2011/0002397 A1* | 1/2011 | Wang | H04N 19/30 | 375/240.26 |
| 2011/0096828 A1* | 4/2011 | Chen | H04N 21/8456 | 375/E7.126 |
| 2011/0164683 A1* | 7/2011 | Takahashi | H04N 19/31 | 375/E7.123 |
| 2011/0187503 A1* | 8/2011 | Costa | H05K 7/1498 | 340/8.1 |
| 2011/0239078 A1* | 9/2011 | Luby | H04N 21/23106 | 714/752 |
| 2012/0185907 A1* | 7/2012 | Park | H04N 21/242 | 725/110 |
| 2012/0250619 A1* | 10/2012 | Twitchell, Jr. | H04W 40/28 | 370/328 |
| 2012/0320168 A1* | 12/2012 | Yun | H04N 21/4347 | 348/51 |
| 2013/0136193 A1* | 5/2013 | Hwang | H04L 65/80 | 714/776 |
| 2013/0305304 A1* | 11/2013 | Hwang | H04L 65/65 | 725/109 |
| 2013/0339474 A1 | 12/2013 | Picker et al. | | |
| 2014/0098289 A1* | 4/2014 | Jang | H04N 21/440263 | 348/441 |
| 2014/0119712 A1* | 5/2014 | Jang | G11B 20/10 | 386/248 |
| 2014/0211861 A1* | 7/2014 | Lee | H04N 19/89 | 375/240.27 |
| 2017/0155404 A1* | 6/2017 | Karkkainen | H03M 7/6011 | |
| 2018/0091765 A1* | 3/2018 | Mobasher | H04L 1/0017 | |
| 2018/0270539 A1* | 9/2018 | Kim | H04W 4/06 | |
| 2022/0415333 A1* | 12/2022 | Zhu | G10L 25/51 | |

FOREIGN PATENT DOCUMENTS

| | | |
|---|---|---|
| JP | H06303436 A | 10/1994 |
| JP | 2008311858 A | 12/2008 |

\* cited by examiner

HIGH-SPEED REAL-TIME DATA TRANSMISSION METHOD AND APPARATUS, DEVICE, AND STORAGE MEDIUM

CROSS-REFERENCE TO RELATED APPLICATION

This application claims priority to Chinese Patent Application No. 202110902372.3, filed on Aug. 6, 2021, the content of which is incorporated herein by reference in its entirety.

TECHNICAL FIELD

The present disclosure generally relates to the field of electronic technologies and, more particularly, to a high-speed real-time data transmission method and apparatus, a device, and a storage medium.

BACKGROUND

In application scenarios of high-speed real-time data transmission, a data transmission speed directly affects application performance. For example, outbreak of the COVID-19 pandemic has prompted companies to accelerate digital transformation process and video live broadcast has become an effective connection and driving method for companies' internal communication and external marketing, and has also become an important driving force for companies' revenue growth. Efficient and real-time video transmission is particularly important for live broadcasts.

SUMMARY

In accordance with the disclosure, there is provided a high-speed real-time data transmission method including performing deduplication processing on first encoded data from a transmission device to obtain target data. The first encoded data is obtained by encoding corresponding data using a first encoding algorithm. The method further includes encoding the target data using a second encoding algorithm to obtain second encoded data, and sending the second encoded data to a receiving device. A compression ratio of the second encoding algorithm is greater than a compression ratio of the first encoding algorithm.

Also in accordance with the disclosure, there is provided an electronic device including a memory and a processor. The memory stores a computer program that, when executed by the processor, causes the processor to perform deduplication processing on first encoded data from a transmission device to obtain target data. The first encoded data is obtained by encoding corresponding data using a first encoding algorithm. The computer program further causes the processor to encode the target data using a second encoding algorithm to obtain second encoded data, and send the second encoded data to a receiving device. A compression ratio of the second encoding algorithm is greater than a compression ratio of the first encoding algorithm.

Also in accordance with the disclosure, there is provided a non-transitory computer-readable storage medium storing a computer program that, when executed by a processor, causes the processor to perform deduplication processing on first encoded data from a transmission device to obtain target data. The first encoded data is obtained by encoding corresponding data using a first encoding algorithm. The computer program further causes the processor to encode the target data using a second encoding algorithm to obtain second encoded data, and send the second encoded data to a receiving device. A compression ratio of the second encoding algorithm is greater than a compression ratio of the first encoding algorithm.

BRIEF DESCRIPTION OF THE DRAWINGS

The following drawings are merely examples for illustrative purposes according to various disclosed embodiments and are not intended to limit the scope of the present disclosure. In the drawings, same or similar reference numerals/characters refer to the same or corresponding parts.

The flowcharts shown in the drawings are only examples for illustrative purposes, and do not necessarily include all contents and operations/processes, nor do they have to be performed in the order described. For example, some operations/processes can be further divided, some operations/processes can be combined or partially combined, and the actual execution order may be changed according to the actual situation.

DETAILED DESCRIPTION OF THE EMBODIMENTS

Reference will now be made in detail to exemplary embodiments of the disclosure, which are illustrated in the accompanying drawings. Hereinafter, embodiments consistent with the disclosure will be described with reference to drawings. Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Unless otherwise defined, all technical and scientific terms used herein have the same meaning as commonly understood by those skilled in the technical field to which the present disclosure belongs. The terms used herein are only for the purpose of describing the embodiments of the present disclosure, and are not intended to limit the scope of the present disclosure.

In the present disclosure, description with reference to the terms "one embodiment," "some embodiments," "example," "specific example," or "some examples," etc., means that specific features described in connection with the embodiment or example, structure, material or feature is included in at least one embodiment or example of the present disclosure. Furthermore, the particular features, structures, materials or characteristics described may be combined in any suitable manner in any one or more embodiments or examples. Furthermore, those skilled in the art may combine the different embodiments or examples described in this specification, as well as the features of the different embodiments or examples, as long as they do not conflict with each other.

In the present disclosure, the terms "first," "second," and "third" are only used for descriptive purposes, and should not be understood as indicating or implying relative importance or implying the number of indicated technical features. Thus, a feature described with "first," "second," and "third" may expressly or implicitly include at least one of this feature, and the order may be changed according to the actual situations.

Figure 1A:
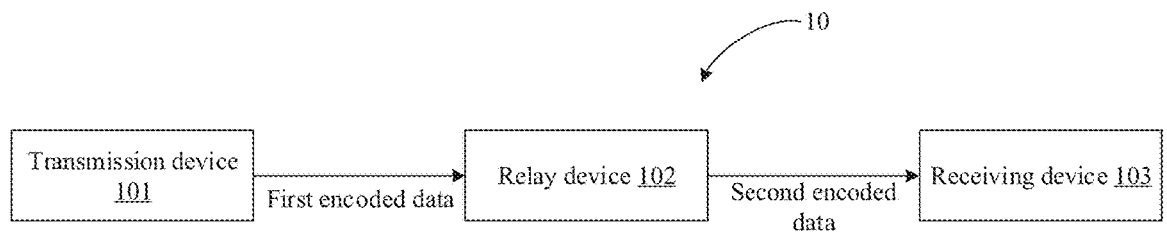
FIGS. 1A and 1B show example high-speed real-time data transmission systems consistent with the present disclosure.
Figure 1B:
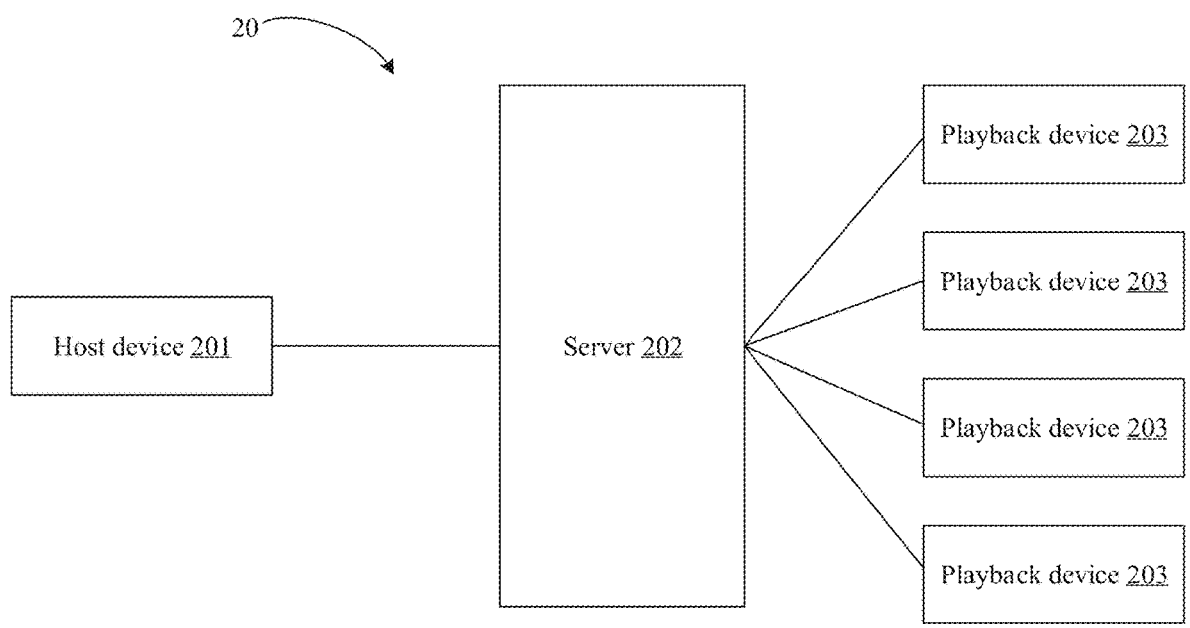

To illustrate the high-speed real-time data transmission method provided by various embodiments of the present disclosure, architectures of high-speed real-time data transmission systems will be described first. FIGS. 1A and 1B show high-speed real-time data transmission systems consistent with the disclosure. The high-speed real-time data transmission systems shown in FIGS. 1A and 1B are used as examples to illustrate the present disclosure, and do not limit the scope of the present disclosure. The technical solutions of the embodiments of the present disclosure are applicable not only to live broadcast scenarios, but also to other high-speed real-time data transmission scenarios. With the evolution of high-speed real-time data transmission systems and the emergence of new service scenarios, the technical solutions provided in the embodiments of the present disclosure are also applicable to similar technical problems.

As shown in FIG. 1A, the architecture of the high-speed real-time data transmission system 10 includes: a transmission device 101, a relay device 102, and a receiving device 103. The transmission device 101 is configured to encode and encapsulate data, thereby obtaining first encoded data. Then, the first encoded data is sent to the relay device 102. The relay device 102 receives the first encoded data, re-encodes the first encoded data to obtain second encoded data; and then distributes the second encoded data to the receiving device 103. The receiving device 103 decodes the second encoded data, and presents decoded data content.

Optionally, the transmission device 101 and the receiving device 103 may be various forms of electronic devices with communication functions and data processing functions, such as mobile phones, tablet computers, notebook computers, computer equipment, vehicle-mounted equipment, wearable devices, or display devices (such as TVs or projectors). The relay device 102 may be various electronic devices with communication functions and data processing functions, for example, may be a server, a server cluster, a personal computer, or a notebook computer.

For example, FIG. 1B shows the structure of a live broadcast system 20 in a live broadcast scene. The live broadcast system 20 includes: a host device 201, a server 202 (an example of the relay device 102), and playback devices 203 (that is, fan terminal devices). In the present disclosure, the transmission device 101 may be either the host device 201 or a playback device 203. Correspondingly, the receiving device 103 may be either the playback device 203 or the host device 201.

Figure 2:
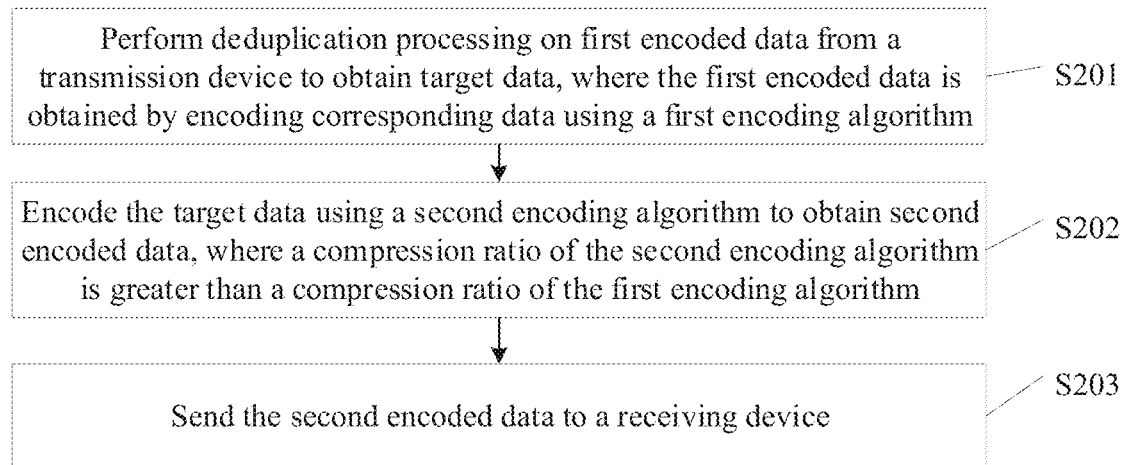
FIG. 2 is a flow chart of an exemplary high-speed real-time data transmission method consistent with the present disclosure.

One embodiment of the present disclosure provides a high-speed real-time data transmission method, and FIG. 2 is a schematic flowchart of the high-speed real-time data transmission method in the present embodiment. The method is applied to the relay device 102. As shown in FIG. 2, the method includes S201 to S203.

At S201, deduplication processing is performed on first encoded data from the transmission device to obtain target data. The first encoded data is obtained by encoding corresponding data using a first encoding algorithm.

For the live broadcast scenario, in some embodiments, the transmission device may be the host device, and correspondingly, the receiving device may be the playback device (i.e., a fan terminal). Correspondingly, the first encoded data may be video frame data collected by the host device, or multimedia data such as text and audio input by the host through the host device. In other embodiments, the transmission device may be the playback device (that is, the fan terminal), and correspondingly, the receiving device may be the broadcast device. Correspondingly, the first encoded data may be data including text, audio, likes, messages input by fans, or gifts to the anchor, through the playback device. In other high-speed real-time data transmission scenarios, the first encoded data may be data that needs to be transmitted to the receiving device in the scenarios, and the type of the data is not limited in the present disclosure.

The first encoding algorithm may be related to the type of the first encoded data. For example, when the first encoded data is a video frame, the transmission device may use a video encoding algorithm to encode the collected video frame data to obtain the first encoded data. The type of the video encoding algorithm that is adopted is not limited in the present disclosure and needs to meet real-time indicators of actual application scenarios. For example, in the live broadcast scenario, the transmission device may use video compression algorithms such as H.264 or H.265 to encode the collected video frame data. In another example, the first encoded data may be an audio frame, and correspondingly, the transmission device may use an audio encoding algorithm to encode the collected audio data. There is no limit on which audio encoding algorithm is used in the present disclosure as long as the algorithm meets real-time indicators of actual application scenarios.

The deduplication processing may include deleting redundant data in the first encoded data, such as deleting data that is repeated in the first encoded data and other encoded data. Correspondingly, the amount of the data sent to the receiving device may be reduced, to save network traffic and enhance the real-time nature of data transmission. In some embodiments, the relay device may implement S201 according to S304 to S307.

At S202, a second encoding algorithm is used to encode the target data to obtain second encoded data. A compression ratio of the second encoding algorithm is greater than a compression ratio of the first encoding algorithm.

In the present embodiment, the second encoding algorithm may be various algorithms with the compression ratio higher than the compression ratio of the first encoding algorithm. For example, the second encoding algorithm may be the VP9 algorithm. The deduplicated first encoded data (that is, the target data) may be encoded by the second encoding algorithm with the compression ratio higher than the compression ratio of the first encoding algorithm, and then sent to the receiving device. Correspondingly, the amount of the data that is transmitted to the receiving device may be further reduced, to further save network traffic and enhance the real-time performance of data transmission.

At S203, the second encoded data is sent to the receiving device.

In some embodiments, the second encoded data may include video frames, and the relay device may send the received multiple pieces of second encoded data to the receiving device in units of slices. Each slice may include at least two pieces of second encoded data, that is, at least two different video frames. The relay device may coordinate at least one key frame into one slice, to ensure that each slice includes at least one key frame. Correspondingly, it may be ensured that when receiving a slice, the receiving device may be capable of immediately decode P frame and B frame in the slice based on the key frame in the slice to obtain a complete image without waiting for other slices with key frames to arrive before decoding. The real-time playback of the content may be ensured while the display effect of the picture may be ensured.

The present disclosure has no limit on a size of each slice as long as the size of the slice meets requirements of real-time indicators of real-time play or real-time transmission.

In this embodiment, after receiving the first encoded data sent by the transmission device, the relay device may not directly forward the data to the receiving device, but may first perform the deduplication processing on the first encoded data and then use the second encoding algorithm with a larger compression ratio to encode the obtained target data before sending it out. Correspondingly, the amount of transmitted data may be effectively reduced, thereby saving network traffic and further enhancing the real-time nature of data transmission.

In some embodiments, the second encoding algorithm may have a distortion degree less than or equal to a distortion degree of the first encoding algorithm. The second encoding algorithm may be a VP9 encoding algorithm. The method may be applied to a network live broadcast scenario, and the relay device may be a steaming media server.

As an efficient encoding algorithm, the compression quality of the VP9 encoding algorithm is comparable to that of the commonly used H.265 encoding algorithm, but the compression efficiency is much higher than that of the H.265 encoding algorithm without loss of image quality. Compared with H.264, VP9 and H.265 may save about 50% of network traffic and bandwidth under the premise of the same visual clarity, and the VP9 encoding algorithm has high compatibility comparable to H.264. Thus, for live broadcast, compared with H.265 and H.264 algorithms, the VP9 algorithm may enhance the real-time performance of data transmission and improve the performance of high-speed real-time data transmission system. Therefore, the relay device using the VP9 algorithm may be capable of allowing fans to directly use a browser to play the data.

Figure 3:
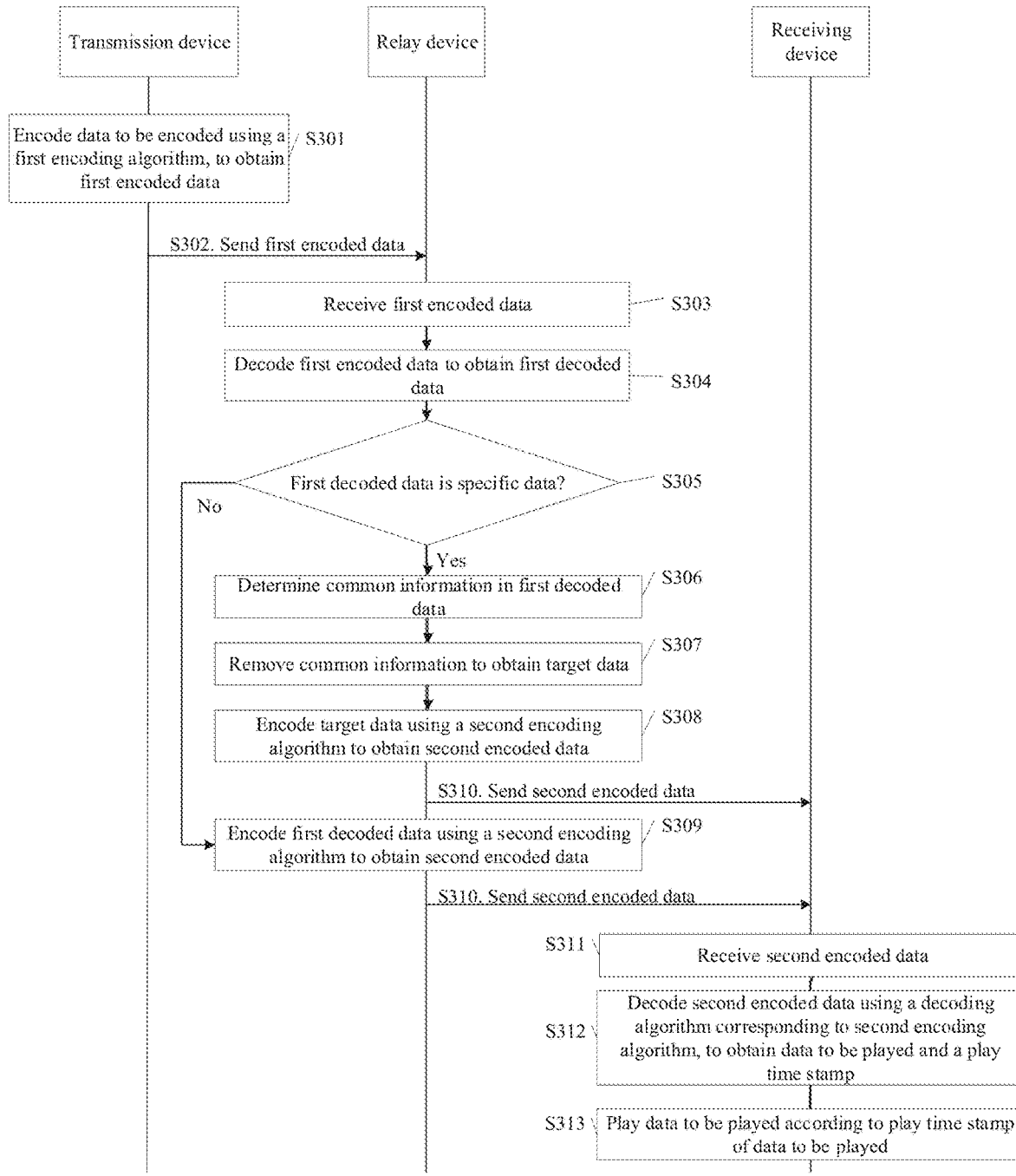
FIG. 3 is a flow chart of another high-speed real-time data transmission method consistent with the present disclosure.

Another embodiment of the present disclosure provides another high-speed real-time data transmission method. As shown in FIG. 3, which is a flow chart of the high-speed real-time data transmission method, in one embodiment, the high-speed real-time data transmission method includes S301 to S313.

At S301, the transmission device uses the first encoding algorithm to encode data to be encoded, to obtain the first encoded data.

At S302, the transmission device sends the first encoded data to the relay device.

At S303, the relay device receives the first encoded data.

At S304, the relay device decodes the first encoded data to obtain first decoded data.

The present disclosure has no limit on the type of the first encoded data, that is to say, the high-speed real-time data transmission method provided by the present disclosure may be applied to various types of data transmission. For example, in one embodiment, the first encoded data may be multimedia data such as video frames, audio frames, or texts. In a live webcast scenario, the transmission device may be a fan-side device (i.e., a playback device), and then the first encoded data may be any data that needs to be transmitted to the host device, such as audio frames, text, likes, or gifts.

In some embodiments, the relay device may determine an encoding algorithm used by the first encoded data, and then use a decoding algorithm corresponding to the encoding algorithm to decode the first encoded data.

At S305, the relay device determines whether the first decoded data is specific data. In response to the first decoded data being the specific data, the relay device executes S309; and in response to the first decoded data being not the specific data, the relay device executes S306.

In some embodiments, the specific data may include data first sent by the transmission device and data last sent by the transmission device. For example, the specific data may be the first or last to-be-played video frame or audio frame received by the relay device. That is, in response to the first decoded data being intermediate data, the deduplication processing at S306 to S307 may be performed on the data. Correspondingly, the volume of the data being transmitted may be reduced while the receiving device may be ensured to obtain the correct data by decoding. The network traffic may be saved and the real-time performance of data transmission may be enhanced. Of course, in some other embodiments, the specific data may not only refer to the first and last data received by the relay device, but may also include the second to N-th data received where N is less than the total number of pieces of data received.

At S306, the relay device determines common information in the first decoded data. The common information may be information that is repeated in the received third encoded data.

At S307, the relay device removes the common information to obtain the target data.

In some embodiments, the first decoded data may include a first frame to be played (first to-be-played frame), and the common information includes information in the first frame to be played that is duplication of non-playable content of a frame to be played (to-be-played frame) in the third encoded data.

The non-playable content may be used to define attributes and specifications of the frame to be played. For example, the non-playable content may include the type, size, compression method, playback timestamp, or encoding timestamp of the frame to be played. This information may be configured in header information of the frame to be played, or may be configured in tail information of the frame to be played.

Further, in some embodiments, the relay device may determine the common information from the header information of the first frame to be played.

In one embodiment, the relay device may remove the common information in the first frame to be played. Correspondingly, since there is common information in the specific data, the above solution may reduce the amount of data transmitted while ensuring that the receiving device is able to correctly decode the received data, thereby saving network traffic and enhancing the real-time nature of data transmission.

In some embodiments, the specific data may include the first data, or the second to Nth data received by the relay device. In response to the data not including the common information, the common information may be added therein. For example, the common information may be added to the head or tail of the data.

At S308, the relay device uses the second encoding algorithm to encode the target data to obtain the second encoded data, and then proceeds to S310.

At S309, the relay device uses the second encoding algorithm to encode the first decoded data to obtain the second encoded data, and then proceeds to S310.

In some embodiments, the first decoded data may include first frames to be played. When the first frames to be played include the last frame (or the last plurality of frames) to be played received by the relay device, the header information of the last frame (or the last plurality of frames) to be played may be removed, to obtain one (or a plurality of) second frames to be played. A live broadcast end identifier may be added to the one (or a plurality of) second frames to be played, to obtain one piece of (or a plurality of pieces of) target data. The second encoding algorithm may be used to encode the one piece of (or a plurality of pieces of) target data to obtain one piece of (or a plurality of pieces of) second encoded data. The frame to be played may be a video frame or an audio frame etc. A number of the more second frames to be displayed may be, for example, 2 to 5.

In some embodiments, when the first frame to be played is the first frame to be played received by the relay device, the second encoding algorithm may be directly used to encode the first frame to be played to obtain the second encoded data. Of course, the relay device may also not perform deduplication processing on the received second or third frame to be played. Correspondingly, the receiving device may be prevented from being unable to correctly decode subsequently received data because of decoding failure when receiving the first second encoded data.

At S310, the relay device sends the second encoded data to the receiving device.

At S311, the receiving device receives the second encoded data.

At S312, the receiving device decodes the second encoded data using a decoding algorithm corresponding to the second encoding algorithm, to obtain the data to be played (to-be-played data) and a corresponding play timestamp.

At S313, the receiving device plays the data to be played according to the play timestamp of the data to be played.

Figure 4:
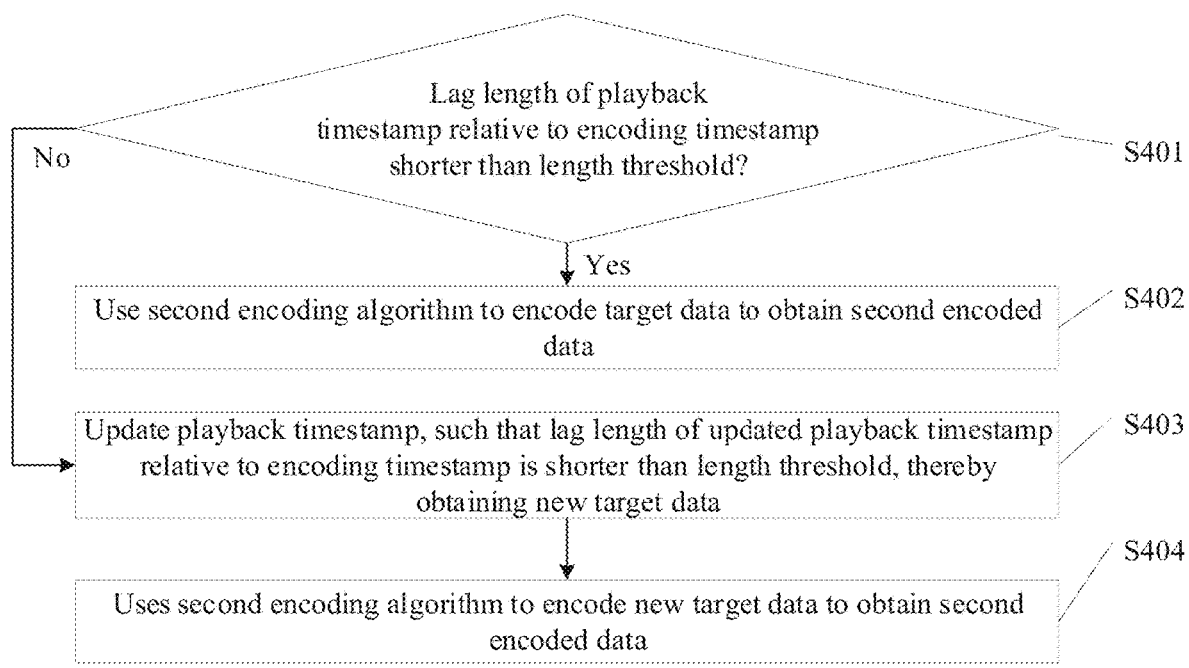
FIG. 4 is a flow chart for processing target data consistent with the present disclosure.

In some embodiments, the target data may include a playback timestamp of a frame to be played carried by the first encoded data and an encoding timestamp of the first encoded data. Correspondingly, as shown in FIG. 4, the method further includes S401 to S404.

At S401, the relay device determines whether a lag length of the playback timestamp relative to the encoding timestamp is shorter than a length threshold. In response to the lag length being shorter than the length threshold, S402 is executed. In response to the lag length being not shorter than the length threshold, S403 is executed.

In the present disclosure, the size of the length threshold may be not limited, and may be any value that is suitable to meet the performance indicator of the actual scene.

At S402, the relay device uses the second encoding algorithm to encode the target data to obtain the second encoded data.

At S403, when the lag length of the playback timestamp relative to the encoding timestamp is greater than or equal to the length threshold, the relay device updates the playback timestamp, such that the lag length of the updated playback timestamp relative to the encoding timestamp is shorter than the length threshold, thereby obtaining new target data.

At S404, the relay device uses the second encoding algorithm to encode the new target data to obtain the second encoded data.

For high-speed real-time data transmission scenarios, the time difference between the playback timestamp and the encoding timestamp of the frame to be played should be smaller than, or even equal to, the length threshold, such that the playback rate at the receiving end is able to keep up with the decoding rate. For live broadcast scenarios, it is especially important that the playback timestamp is consistent with the encoding timestamp. This is because only when the playback timestamp keeps up with the encoding timestamp, the effect of play-as-you-go is able to be ensured, to ensure the synchronization of the content between the host and the player and the interactive experience between the host and fans. Because of the influence of network delay and other conditions, sometimes the playback timestamp lags behind the encoding timestamp, such that the purpose of play-as-you-go cannot be achieved and user experience is affected.

Therefore, in the present disclosure, when it is found that the lag length of the playback timestamp relative to the encoding timestamp is greater than or equal to the length threshold, the playback timestamp in the target data may need to be updated, such that the updated playback timestamp no longer lags behind the encoding timestamp, thereby solving the problem of lag in content playback at the receiving end.

In some embodiments, the degree of distortion of the second encoding algorithm may be less than or equal to the degree of distortion of the second encoding algorithm. The second encoding algorithm may be a VP9 encoding algorithm. The method may be applied to a network live broadcast scenario, such as a server in a webcast system.

An exemplary application of the embodiments of the present disclosure in a practical application scenario will be described below.

In one embodiment of the present disclosure, based on a field-programmable gate array (FPGA) card and an NGcodec package, ffmpeg codes may be modified, to add header and tail information and timestamps to the video frames, and finally use a WebM wrapper may be used to recalculate the encoding timestamp (dts) and the playback timestamp (pts). The pts timestamp control logic may be rewritten to ensure the coordination of slices and key frames. Finally, an AVPacket structure may be adjusted, and the instantaneous decoding refresh (IDR) information may take over the GOP to implement key frame slicing.

Figure 5:
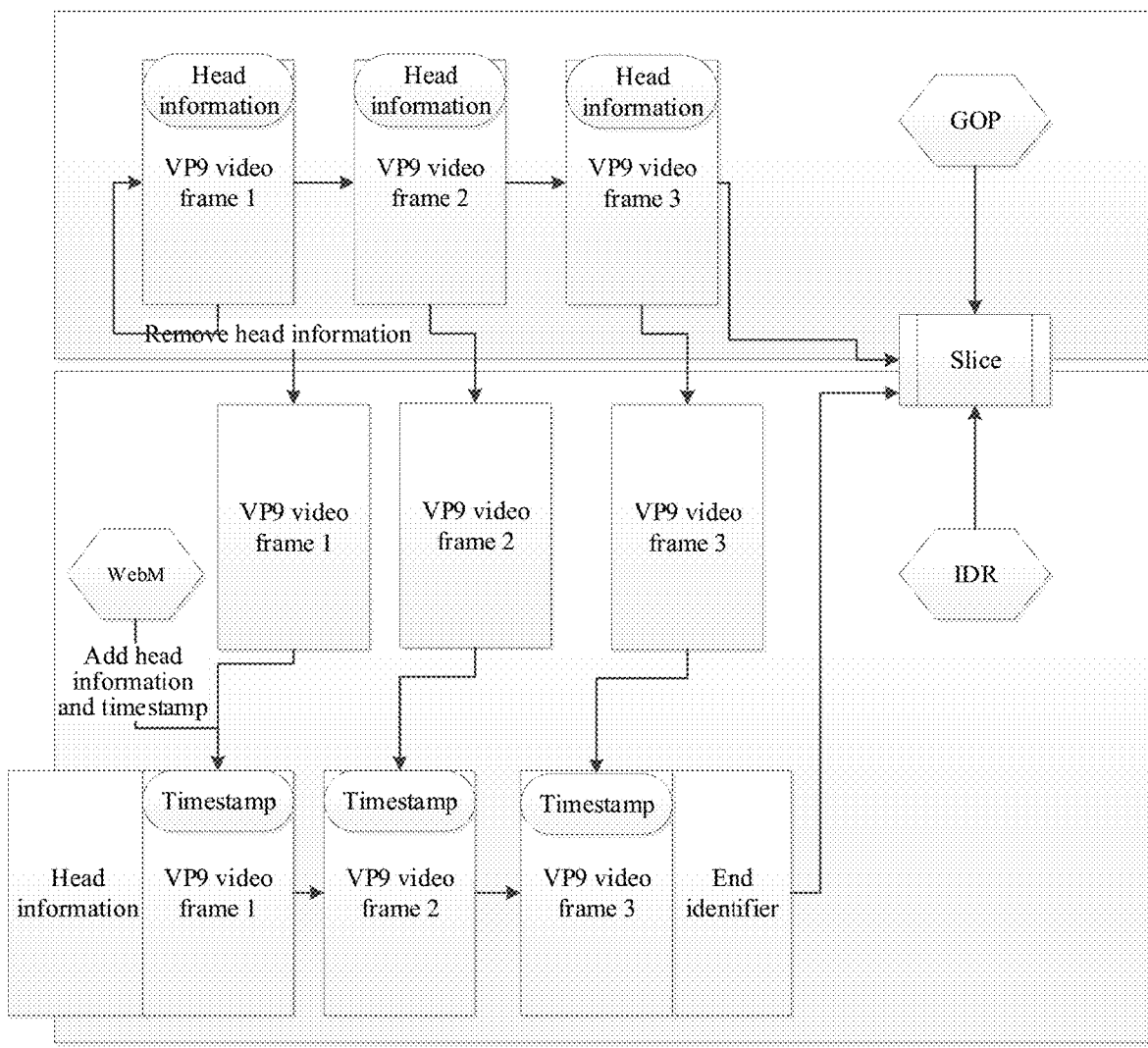
FIG. 5 is a flow chart for processing live broadcast stream using a VP9 encoding algorithm consistent with the present disclosure.

The VP9 encoding process of the live video stream is shown in FIG. 5.

1. After a VP9 container receives VP9 video frame 1, VP9 video frame 2, VP9 video frame 3, etc., the VP9 container removes the header information of the video frames from the frame.

2. A WebM component recalculates dts and pts, and generates pts timestamps to control the order of video streams;

3. For the first video frame, header information is added to the video frame, and for the last video frame, an end mark is added, and only the timestamp information is added to a video frame between the first and last video frames.

4. The AVPacket structure is adjusted, and the IDR information takes over the GOP to realize the key frame slicing. The purpose is to ensure the coordination between the slice interval and the key frame, and to maintain the orderly output of video frames.

In hardware implementation, the above process may be implemented using an FPGA card.

It should be noted that although the various processes of the methods of the present disclosure are depicted in the figures in a particular order, this does not require or imply that the processes must be performed in that particular order or that all illustrated processes must be performed to achieve the desired result. Additionally or alternatively, certain processes may be omitted, multiple processes may be combined into one process for execution, and/or one process may be divided into multiple processes for execution, and the like.

Based on the foregoing embodiments, the present disclosure also provides a high-speed real-time data transmission apparatus. Circuits included in the device or units included in each circuit may be implemented by a processor or a specific logic circuit. In the process of implementation, the processor may be a field programmable gate array (FPGA), a central processing unit (CPU), a microprocessor (MPU), or a digital signal processor (DSP).

Figure 6:
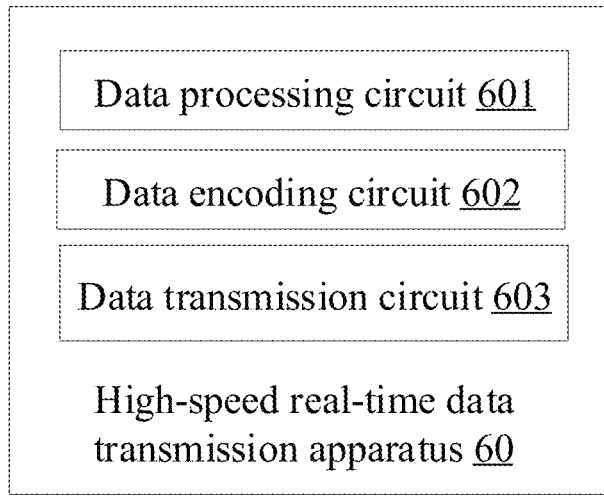
FIG. 6 is a structural diagram of a high-speed real-time data transmission apparatus consistent with the present disclosure.

FIG. 6 is a schematic structural diagram of a high-speed real-time data transmission apparatus 60 provided by one embodiment of the present disclosure. As shown in FIG. 6, the apparatus 60 includes a data processing circuit 601, a data encoding circuit 602, and a data transmission circuit 603.

The data processing circuit 601 may be configured to perform deduplication processing on the first encoded data from the transmission device to obtain target data. The first encoded data may be obtained by encoding corresponding data using the first encoding algorithm.

The data encoding circuit 602 may be configured to use the second encoding algorithm to encode the target data to obtain the second encoded data. The compression ratio of the second encoding algorithm may be greater than the compression ratio of the first encoding algorithm.

The data transmission circuit 603 may be configured to send the second encoded data to the receiving device.

In some embodiments, the data processing circuit 601 may be configured to: decode the first encoded data to obtain the first decoded data; and determine the common information in the first decoded data in response to the first decoded data which is not the specific data in the data. The common information may be the information that is repeated with the received third encoded data. The common information may be removed to obtain the target data.

In some embodiments, the first decoded data may include the first frame to be played, and the common information may include repetition content in the non-playable content of the first frame to be played and the frame to be played in the third encoded data.

In some embodiments, the data processing circuit 601 may be configured to: determine the common information from header information of the first frame to be played.

In some embodiments, the data processing circuit 601 may be further configured to: in response to the first frame to be played being the last frame to be played received, remove the header information of the last frame to be played to obtain the second frame to be played, and add a live broadcast end identifier to the second frame to be played to obtain the target data.

In some embodiments, the target data may include the playback timestamp of the frame to be played carried by the first encoded data and the encoding timestamp of the first encoded data. The data encoding circuit 602 may be further configured to: when the lag length of the playback timestamp relative to the encoding timestamp is greater than or equal to the length threshold, update the playback timestamp, such that the lag length of the updated playback timestamp relative to the encoding timestamp is shorter than the length threshold and obtain the new target data; and use the second encoding algorithm to encode the new target data to obtain the second encoded data.

In some embodiments, the distortion degree of the second encoding algorithm may be less than or equal to the distortion degree of the second encoding algorithm. The second encoding algorithm may be a VP9 encoding algorithm. The high-speed real-time data transmission apparatus may be applied to a network live broadcast scenario.

The descriptions of the above apparatus embodiments are similar to the descriptions of the above method embodiments, and have similar beneficial effects to the method embodiments. For technical details not disclosed in the apparatus embodiments of the present disclosure, reference may be made to the descriptions of the method embodiments of the present disclosure for understanding.

In the embodiments provided in the present disclosure, it should be understood that the disclosed system, apparatus, and method may be implemented in other ways. For example, the apparatus embodiments described above are only illustrative. For example, the division of the units is only a logical function division, and there may be other divisions in actual implementation. For example, multiple units or components may be combined or can be integrated into another system, or some features can be ignored or not implemented. In addition, the displayed or discussed mutual coupling or direct coupling or communication connection may be indirect coupling or communication connection through some interfaces, devices or units, and may also be electrical, mechanical or other forms of connection. The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments of the present disclosure. In addition, the functional units in the various embodiments of the present disclosure may be integrated into one processing unit, or each unit may exist alone physically, or two or more units may be integrated into one unit. The above-mentioned integrated unit can be implemented in the form of hardware or software functional unit.

When the integrated unit is implemented in the form of a software functional unit and sold or used as an independent product, it can be stored in a computer-readable storage medium. Based on this understanding, all or part of the technical solution can be embodied in the form of a software product. The computer software product is stored in a storage medium, and includes several instructions to enable a computer device (which may be a personal computer, a server, or a network device, etc.) to perform all or some of the processes of the method described in each embodiment of the present disclosure. The aforementioned storage medium includes: a flash disk, a portable hard disk, a read-only memory (ROM), a magnetic disk, an optical disk, or another medium that can store program codes.

Figure 7:
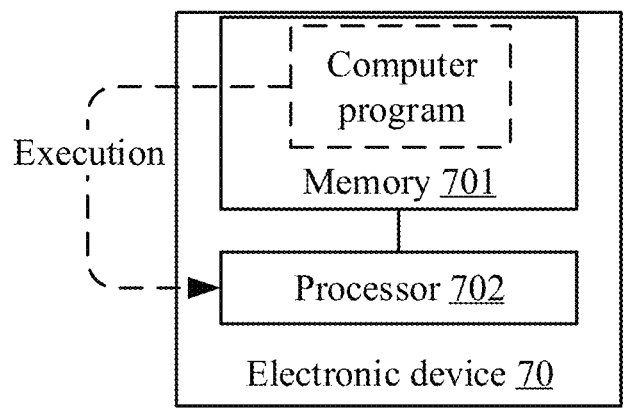
FIG. 7 is a structural diagram of an electronic device consistent with the present disclosure.

The present disclosure also provides an electronic device. FIG. 7 is a schematic hardware of an electronic device (that is, a relay device) provided by one embodiment. As shown in FIG. 7, the electronic device 70 includes a memory 701 and a processor 702. The memory 701 may be used to store a computer program which is able to be executed by the processor. The processor 702 may execute the computer program to realize, e.g., processes executed by the relay device in the methods provided by various embodiments of the present disclosure.

The memory 701 may be configured to store instructions and applications executable by the processor 702, and may also cache data to be processed or already processed by the processor 702 and data to be processed or already processed by various circuits of the electronic device 70 (for example, image data, audio data, voice communication data, or video communication data). The memory 701 may be implemented through a flash memory (FLASH) or a random access memory (RAM).

The present disclosure also provides a computer-readable storage medium. The storage medium may be used to store a computer program. When the computer program is executed, methods provided by various embodiments of the present disclosure may be achieved.

The present disclosure also provides a computer program product. The computer program product, when being executed by a computer, cause the computer to perform a method consistent with the disclosure, such as one of the example methods provided by various embodiments of the present disclosure.

In the present disclosure, description with reference to the terms "one embodiment," "some embodiments," "example," "specific example," or "some examples," etc., means that specific features described in connection with the embodiment or example, structure, material or feature is included in at least one embodiment or example of the present disclosure. Furthermore, the particular features, structures, materials or characteristics described may be combined in any suitable manner in any one or more embodiments or examples. Furthermore, those skilled in the art may combine the different embodiments or examples described in this specification, as well as the features of the different embodiments or examples, without conflicting each other. In various embodiments of the present disclosure, the size of the sequence numbers of the above-mentioned processes does not mean the sequence of execution, and the execution sequence of each process should be determined by its functions and internal logic, rather than the implementation process of the embodiments of the present disclosure. The above-mentioned serial numbers of the embodiments of the present application are only for description, and do not represent the advantages or disadvantages of the embodiments. The above description of the various embodiments tends to emphasize the differences between the various embodiments, and the same or similar points can be referred to each other, and for the sake of brevity, details are not repeated herein.

The term "and/or" in the present disclosure is only an association relationship to describe associated objects, indicating that there can be three kinds of relationships. For example, "object A and/or object B" may mean that object A exists alone, object A and object B exist simultaneously, or object B exists alone.

In the present disclosure, the terms "comprising," "including" or any other variation thereof are intended to encompass a non-exclusive inclusion such that a process, method, article or device comprising a list of elements includes not only those elements, but also others not expressly listed elements, or also include elements inherent to such a process, method, article or apparatus. Without further limitation, an element qualified by the phrase "comprising a . . . " does not preclude the presence of additional identical elements in a process, method, article or apparatus that includes the element.

In the embodiments provided in the present disclosure, it should be understood that the disclosed system, device, and method may be implemented in other ways. For example, the apparatus embodiments described above are only illustrative. For example, the division of the units is only a logical function division, and there may be other divisions in actual implementation. For example, multiple units or components may be combined or can be integrated into another system, or some features can be ignored or not implemented. In addition, the displayed or discussed mutual coupling or direct coupling or communication connection may be indirect coupling or communication connection through some interfaces, devices or units, and may also be electrical, mechanical or other forms of connection.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments of the present disclosure.

In addition, the functional units in the various embodiments of the present disclosure may be integrated into one processing unit, or each unit may exist alone physically, or two or more units may be integrated into one unit. The above-mentioned integrated unit can be implemented in the form of hardware or software functional unit.

A person of ordinary skill in the art can be aware that all or part of the processes in the method embodiments of the present disclosure can be implemented by hardware related to the program instructions. The program may be stored in a computer-readable storage medium. When the program executes, the processes of the method embodiments may be executed. The aforementioned storage medium includes: a mobile storage medium, a read-only memory (ROM), a magnetic disk, an optical disk, or another medium that can store program codes.

When the integrated unit is implemented in the form of a software functional unit and sold or used as an independent product, it can be stored in a computer-readable storage medium. Based on this understanding, all or part of the technical solution can be embodied in the form of a software product. The computer software product is stored in a storage medium, and includes several instructions to enable a computer device (which may be a personal computer, a server, or a network device, etc.) to perform all or part of the steps of the method described in each embodiment of the present disclosure. The aforementioned storage medium includes: a mobile storage medium, a read-only memory (ROM), a magnetic disk, an optical disk, or another medium that can store program codes.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A high-speed real-time data transmission method comprising:

performing deduplication processing on first encoded data from a transmission device, to obtain target data, the first encoded data being obtained by encoding corresponding data using a first encoding algorithm;

encoding the target data using a second encoding algorithm, to obtain second encoded data, a compression ratio of the second encoding algorithm being greater than a compression ratio of the first encoding algorithm, a distortion degree of the second encoding algorithm being less than a distortion degree of the first encoding algorithm; and sending the second encoded data to a receiving device.

2. The method according to claim 1, wherein performing deduplication processing on the first encoded data from the transmission device to obtain the target data includes:

decoding the first encoded data to obtain decoded data;

in response to the first decoded data being not specific data, determining common information in the decoded data, the common information being information repeated in received third encoded data; and removing the common information to obtain the target data.

3. The method according to claim 2, wherein:

the decoded data includes a first frame to be played, and the common information includes information that is repeated in the first to-be-played frame and non-playable content of a to-be-played frame in the third encoded data.

4. The method according to claim 3, wherein determining the common information in the decoded data includes:

determining the common information from header information of the first to-be-played frame.

5. The method according to claim 3, further comprising:

in response to the first to-be-played frame being a to-be-played frame that is last received, removing header information of the first to-be-played frame to obtain a second to-be-played frame; and adding a live broadcast end identifier in the second to-be-played frame to obtain the target data.

6. The method according to claim 1, wherein the target data includes a playback timestamp of a to-be-played frame carried by the first encoded data and an encoding timestamp of the first encoded data; and the method further comprising:

in response to a lag length of the playback timestamp relative to the encoding timestamp being greater than or equal to a length threshold, updating the playback timestamp to obtain an updated playback timestamp having a lag length relative to the encoding timestamp shorter than the length threshold, to obtain new target data; and encoding the new target data using the second encoding algorithm to obtain the second encoded data.

7. The method according to claim 1, wherein:

the second encoding algorithm includes a VP9 encoding algorithm; and the method is applied to a network live broadcast scenario.

8. An electronic device comprising:

a processor; and a memory storing a computer program that, when executed by the processor, causes the processor to:

perform deduplication processing on first encoded data from a transmission device, to obtain target data, the first encoded data being obtained by encoding corresponding data using a first encoding algorithm;

encode the target data using a second encoding algorithm, to obtain second encoded data, a compression ratio of the second encoding algorithm being greater than a compression ratio of the first encoding algorithm, a distortion degree of the second encoding algorithm being less than a distortion degree of the first encoding algorithm; and send the second encoded data to a receiving device.

9. The electronic device according to claim 8, wherein the computer program further causes the processor to:

decode the first encoded data to obtain decoded data;

in response to the first decoded data being not specific data, determine common information in the decoded data, the common information being information repeated in received third encoded data; and remove the common information to obtain the target data.

10. The electronic device according to claim 9, wherein:

the decoded data includes a first frame to be played, and the common information includes information that is repeated in the first to-be-played frame and non-playable content of a to-be-played frame in the third encoded data.

11. The electronic device according to claim 10, wherein the computer program further causes the processor to:

determine the common information from header information of the first to-be-played frame.

12. The electronic device according to claim 10, wherein the computer program further causes the processor to:

in response to the first to-be-played frame being a to-be-played frame that is last received, remove header information of the first to-be-played frame to obtain a second to-be-played frame; and add a live broadcast end identifier in the second to-be-played frame to obtain the target data.

13. The electronic device according to claim 8, wherein:

the target data includes a playback timestamp of a to-be-played frame carried by the first encoded data and an encoding timestamp of the first encoded data; and the computer program further causes the processor to:

in response to a lag length of the playback timestamp relative to the encoding timestamp being greater than or equal to a length threshold, update the playback timestamp to obtain an updated playback timestamp having a lag length relative to the encoding timestamp shorter than the length threshold, to obtain new target data; and encode the new target data using the second encoding algorithm to obtain the second encoded data.

14. The electronic device according to claim 8, wherein:

the second encoding algorithm includes a VP9 encoding algorithm; and the electronic device is applied to a network live broadcast scenario.

15. A non-transitory computer-readable storage medium storing a computer program that, when executed by a processor, causes the processor to:

perform deduplication processing on first encoded data from a transmission device, to obtain target data, the first encoded data being obtained by encoding corresponding data using a first encoding algorithm;

encode the target data using a second encoding algorithm, to obtain second encoded data, a compression ratio of the second encoding algorithm being greater than a compression ratio of the first encoding algorithm, a distortion degree of the second encoding algorithm being less than a distortion degree of the first encoding algorithm; and send the second encoded data to a receiving device.

16. The storage medium according to claim 15, wherein the computer program further causes the processor to:
   decode the first encoded data to obtain decoded data;
   in response to the first decoded data being not specific data, determine common information in the decoded data, the common information being information repeated in received third encoded data; and
   remove the common information to obtain the target data.

17. The storage medium according to claim 16, wherein:
   the decoded data includes a first frame to be played, and the common information includes information that is repeated in the first to-be-played frame and non-playable content of a to-be-played frame in the third encoded data.

18. The storage medium according to claim 17, wherein the computer program further causes the processor to:
   determine the common information from header information of the first to-be-played frame.

19. The storage medium according to claim 17, wherein the computer program further causes the processor to:
   in response to the first to-be-played frame being a to-be-played frame that is last received, remove header information of the first to-be-played frame to obtain a second to-be-played frame; and
   add a live broadcast end identifier in the second to-be-played frame to obtain the target data.

20. The storage medium according to claim 15, wherein:
   the target data includes a playback timestamp of a to-be-played frame carried by the first encoded data and an encoding timestamp of the first encoded data; and
   the computer program further causes the processor to:
      in response to a lag length of the playback timestamp relative to the encoding timestamp being greater than or equal to a length threshold, update the playback timestamp to obtain an updated playback timestamp having a lag length relative to the encoding timestamp shorter than the length threshold, to obtain new target data; and
      encode the new target data using the second encoding algorithm to obtain the second encoded data.

* * * * *